(12) United States Patent
Kapila et al.

(10) Patent No.: US 10,676,136 B2
(45) Date of Patent: Jun. 9, 2020

(54) CROSS-CAR BEAM

(71) Applicant: SABIC Global Technologies B.V., Bergen op Zoom (NL)

(72) Inventors: Vineet Kapila, Northville, MI (US); Mark Turner, Wixom, MI (US); Anil Tiwari, Bangalore (IN); Matthew Delaney, Belleville, MI (US); Amit Kulkarni, Newburg, IN (US); Paul Michael Atkinson, West Chester, PA (US)

(73) Assignee: SABIC Global Technologies B.V., Bergen op Zoom (NL)

( * ) Notice: Subject to any disclaimer, the term of this patent is extended or adjusted under 35 U.S.C. 154(b) by 14 days.

(21) Appl. No.: 15/570,723

(22) PCT Filed: May 2, 2016

(86) PCT No.: PCT/EP2016/059727
§ 371 (c)(1),
(2) Date: Oct. 30, 2017

(87) PCT Pub. No.: WO2016/174259
PCT Pub. Date: Nov. 3, 2016

(65) Prior Publication Data
US 2018/0290691 A1 Oct. 11, 2018

(30) Foreign Application Priority Data
Apr. 30, 2015 (IN) ............................ 1204/DEL/2015

(51) Int. Cl.
*B62D 25/14* (2006.01)
*B62D 29/00* (2006.01)

(52) U.S. Cl.
CPC ......... *B62D 25/145* (2013.01); *B62D 25/147* (2013.01); *B62D 29/001* (2013.01)

(58) Field of Classification Search
CPC ... B62D 25/145; B62D 29/001; B62D 25/147
(Continued)

(56) References Cited

U.S. PATENT DOCUMENTS 5,354,114 A * 10/1994 Kelman ............... B60H 1/0055
296/192
6,123,378 A * 9/2000 Teply .................... B62D 23/005
296/29

FOREIGN PATENT DOCUMENTS

DE 2004056102 A1 6/2005
DE 10360056 A1 7/2005
(Continued)

*Primary Examiner* — Joseph D. Pape
*Assistant Examiner* — Dana D Ivey
(74) *Attorney, Agent, or Firm* — BakerHostetler

(57) ABSTRACT

A cross-car beam, includes a plastic beam body 22, defining a first end 24 and a second end 26 spaced from the first end 24 along a first direction D1, such that the plastic beam body 22 is elongate in the first direction D1. The plastic beam body 22 further defines a cross-sectional shape 28 along, a plane P1 that is normal to the first direction D1. The cross-car beam 20, may further include a metallic beam body 42 configured to be coupled to the plastic beam body 22. The metallic beam body 42 defining a first end 44 and a second end 46 spaced from the first end 44 along a direction, for example the first direction D1 when the metallic bean body 42 is coupled to the plastic beam body 22, such that the metallic beam body 42 is elongate in the first direction D1.

14 Claims, 7 Drawing Sheets

(58) Field of Classification Search
USPC ................................................. 296/193.02
See application file for complete search history.

(56) References Cited

FOREIGN PATENT DOCUMENTS

| | | |
|---|---|---|
| DE | 102004049393 A1 | 7/2005 |
| DE | 102006001348 A1 | 7/2007 |
| FR | 2876655 A1 | 4/2006 |
| WO | 2005037632 A1 | 4/2005 |

* cited by examiner

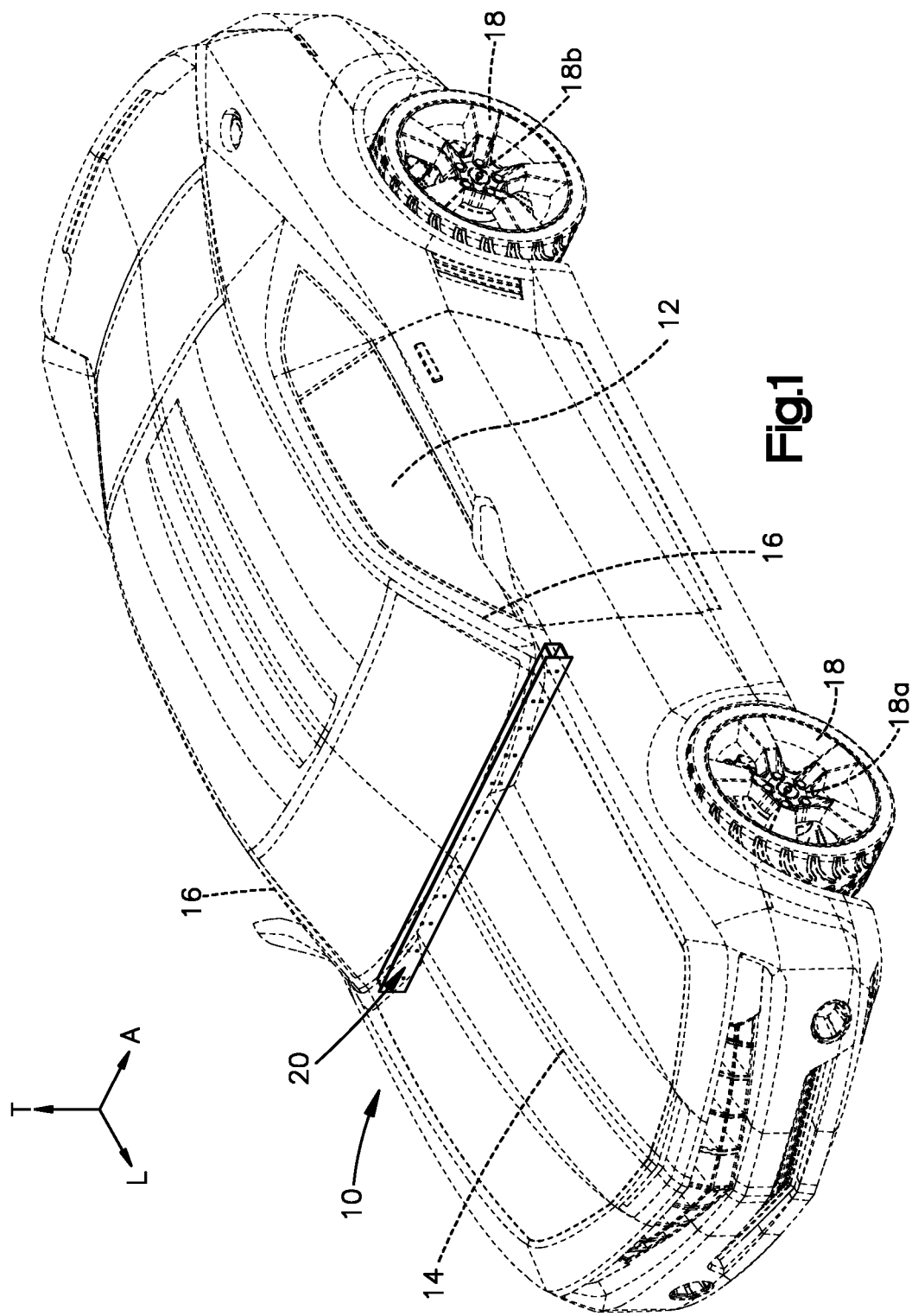

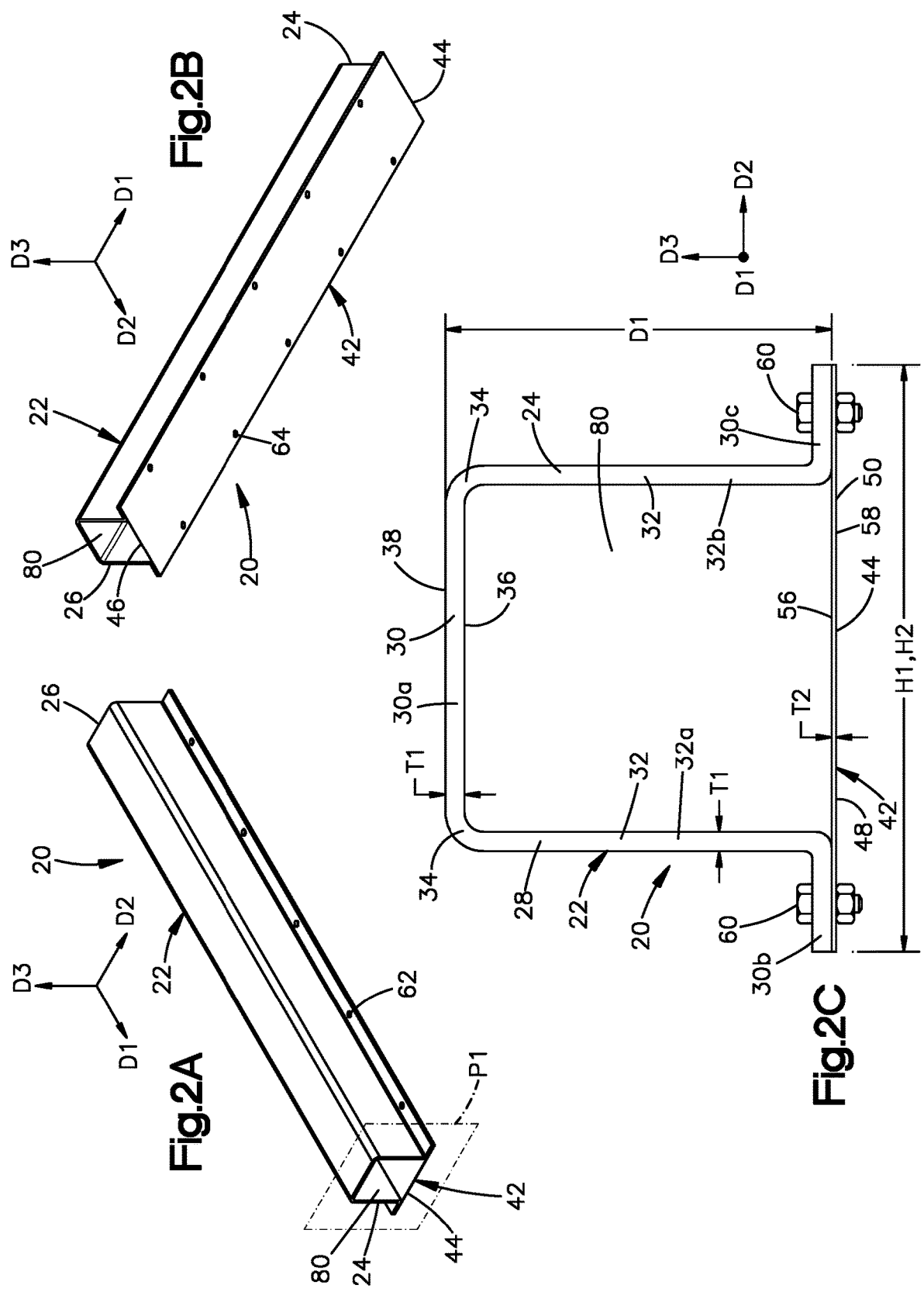

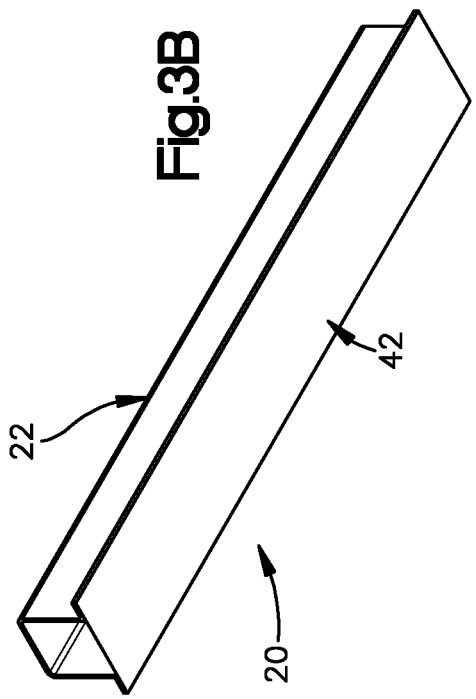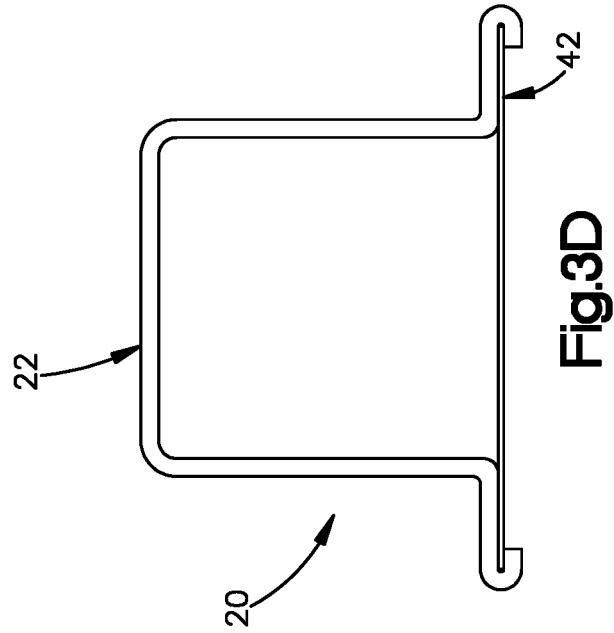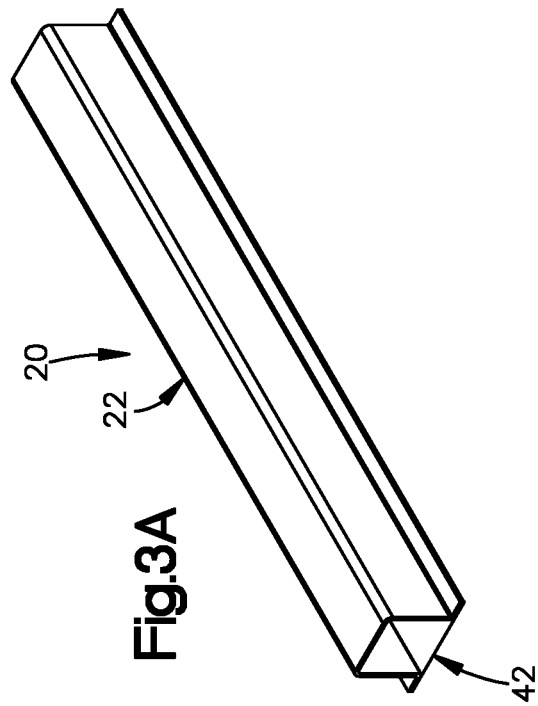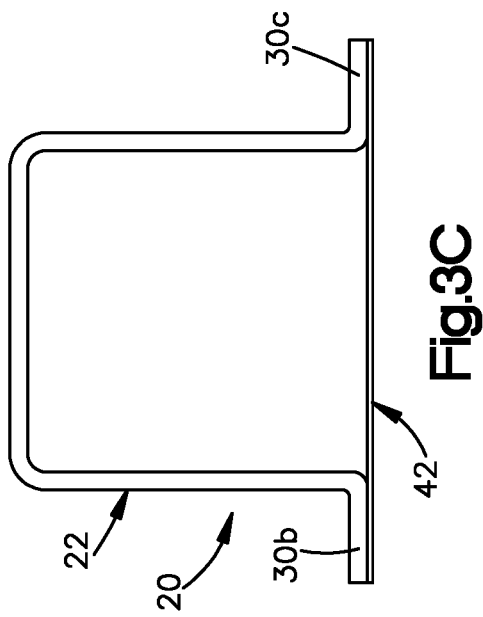

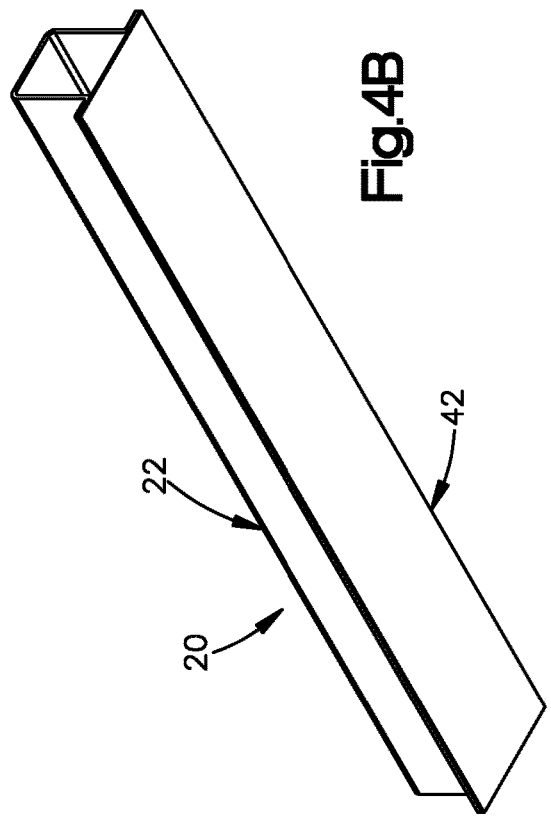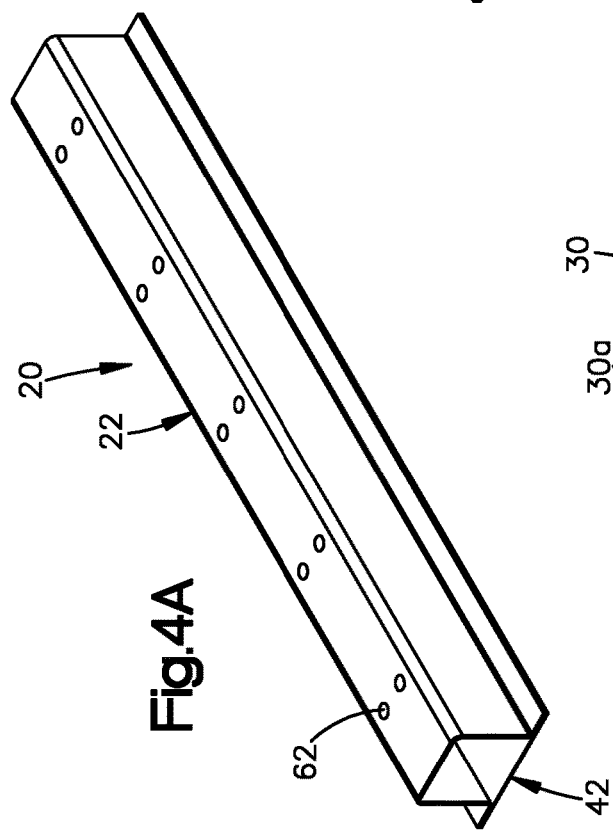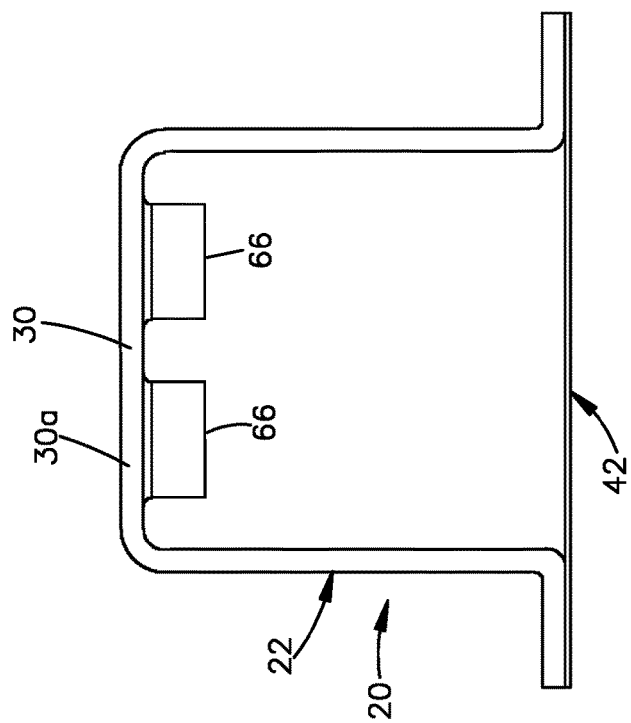

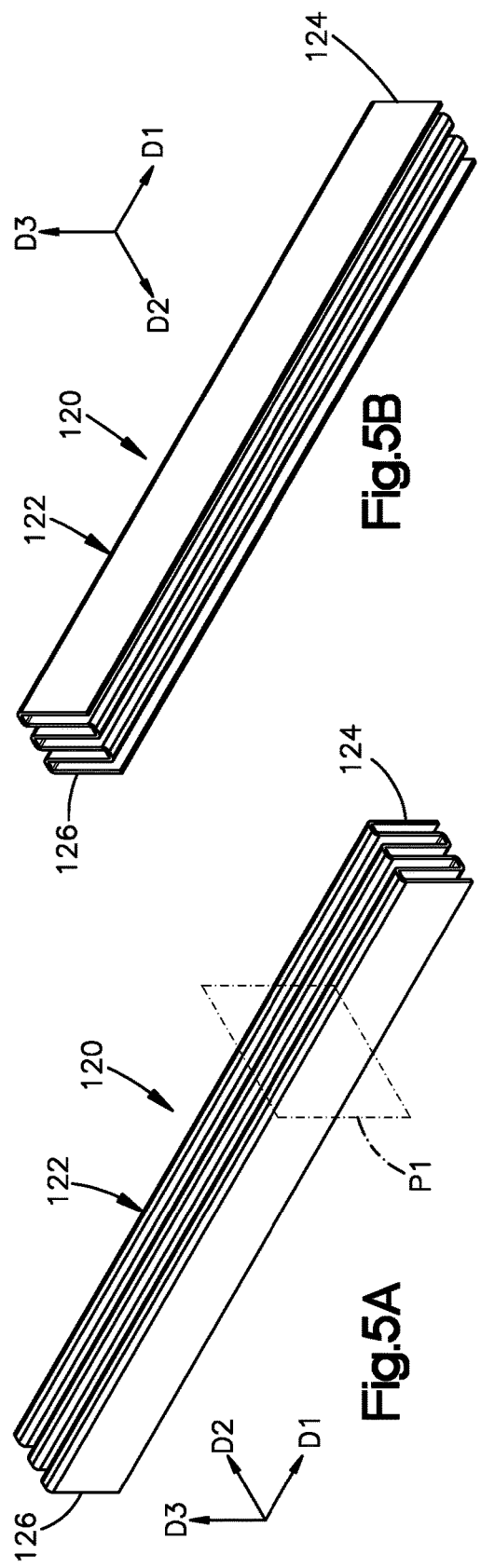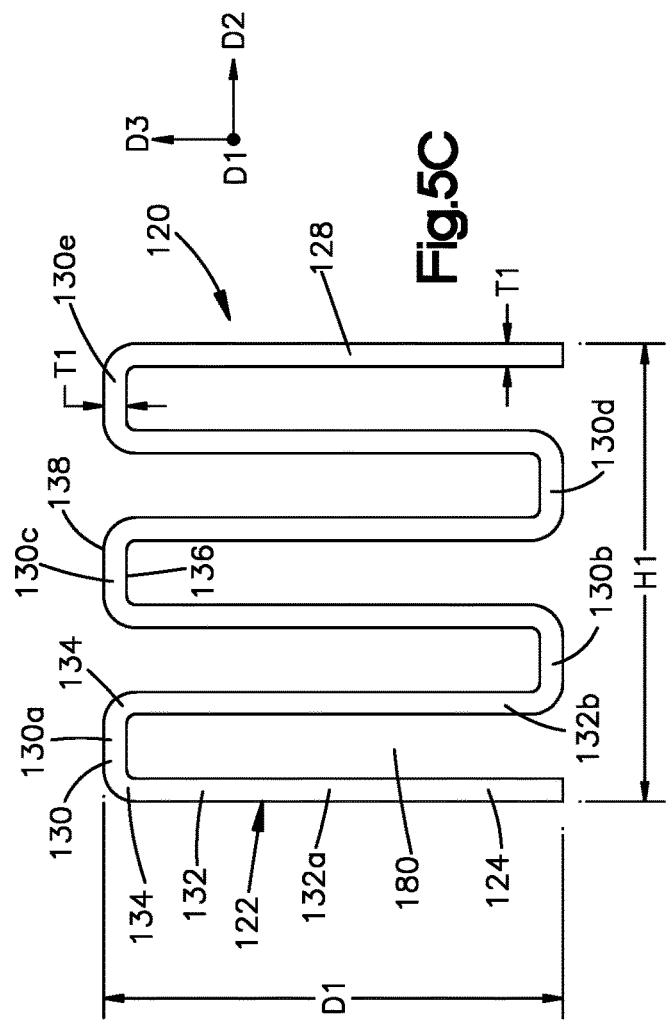
Fig.5A Fig.5B Fig.5C

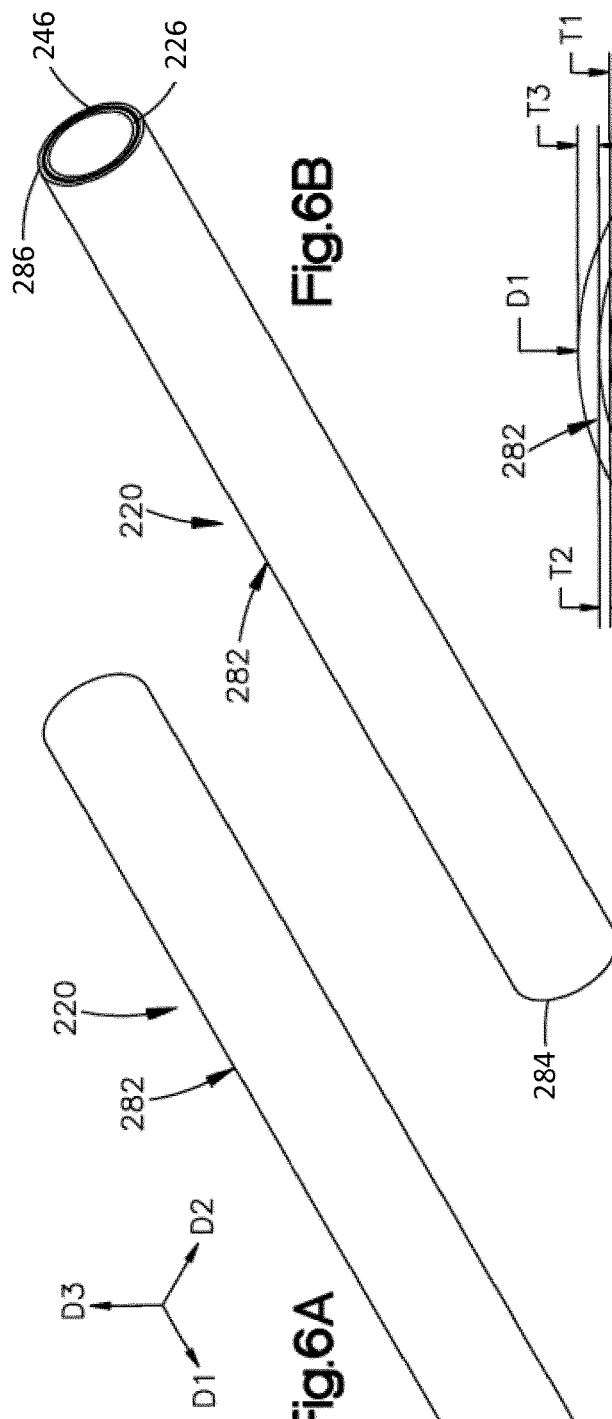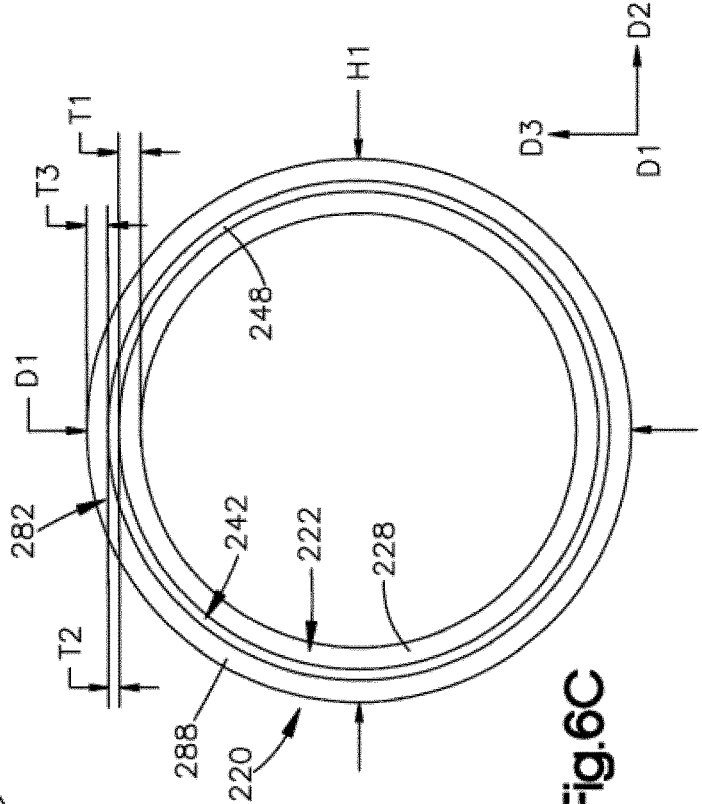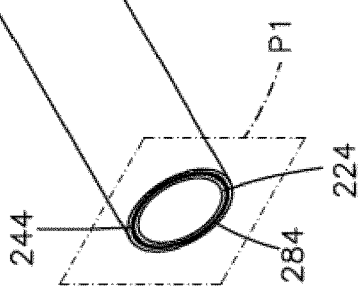

CROSS-CAR BEAM

CROSS-REFERENCE TO RELATED APPLICATIONS

This application is the National Stage of International Application No. PCT/EP2016/059727, filed May 2, 2016, which claims the benefit of Indian Provisional Application No. 1204/DEL/2015, filed Apr. 30, 2015, the disclosures of which are incorporated herein by reference in their entireties.

TECHNICAL FIELD

This disclosure relates generally to cross-car beams and, more particularly, to cross-car beams including plastic materials.

BACKGROUND

Vehicles typically include a cross-car beam that is positioned between the engine compartment of the vehicle and the passenger compartment of the vehicle with respect to a longitudinal direction, and that is further positioned laterally between the A-pillars of the vehicle. The cross-car beam provides strength in the longitudinal direction, for example in the event of a head-on impact, the cross-car beam resists movement of components of the vehicle, for example from the engine compartment, into the passenger compartment. The cross-car beam further provides strength in the lateral direction, for example in the event of a side impact, the cross-car beam resists movement of the A-pillars toward each other along the lateral direction. One measure of the strength of cross-car beams is bending stiffness, or resistance of the member against bending deformation.

The cross-car beam may further provide support for a number of components of the vehicle, including a steering column, one or more airbags, an instrument panel, a glove box, a music system, and a heating, ventilating, and air conditioning system (HVAC).

Known cross-car beams include boxed, rounded, and other shaped sections made of metals, including steel, magnesium, and aluminum. To achieve the required strength necessary to fulfill the requirements of the cross-car beam, the steel cross-car beam typically is one of the heavier components of the vehicle. Weight reduction of vehicle components offers significant benefits in terms of cost reduction arising from increased fuel economy. However, weight reduction of cross-car beams, for example by substituting plastic for the metal typically results in cross-car beams with a reduced strength.

SUMMARY

According to one aspect, a cross-car beam includes a plastic beam body that defines a first end, a second end spaced from the first end in a first direction, such that the plastic beam body is elongate along the first direction, wherein the plastic beam body defines a cross-sectional shape along a plane normal to the first direction, wherein the cross-sectional shape defines: 1) a first section that is elongate in a second direction that is perpendicular to the first direction, and 2) a plurality of second sections that are each elongate along a third direction that is perpendicular to both the first direction and the second direction.

According to another aspect, a cross-car beam includes a plastic beam body that defines a first end, a second end spaced from the first end in a first direction, such that the plastic beam body is elongate along the first direction, the plastic beam body defining a cross-sectional shape along a plane normal to the first direction, wherein the cross-sectional shape defines: 1) a first section that is elongate in a second direction that is perpendicular to the first direction, and 2) a plurality of second sections that each extend from the first section along a respective direction that is offset with respect to the second direction; wherein the cross-car beam includes an opening that extends from the first end to the second end along the first direction, the opening partially defined by the first section and the plurality of second sections such that the opening is open to at least one direction that is perpendicular to the first direction.

According to another aspect, a cross-car beam includes a plastic beam body defining a first end and a second end spaced from the first end along a first direction, such that the plastic beam body is elongate along the first direction, the plastic beam body further defining a cross-sectional shape along a plane normal to the first direction, the cross-sectional shape defining: 1) a first section elongate in a second direction that is perpendicular to the first direction, and 2) a plurality of second sections that extend from the first section along a respective direction that is perpendicular with respect to the first direction and angularly offset with respect to the second direction; and a metallic beam body coupled to the plastic beam body, the metallic beam body defining a first end and a second end spaced from the first end of the metallic beam body along the first direction, such that the metallic beam body is elongate along the first direction.

According to another aspect, a cross-car beam includes a first beam body defining a first end, a second end spaced from the first end in a first direction such that the first beam body is elongate along the first direction, the first beam body defining a first cross-sectional shape that lies along a plane normal to the first direction, wherein the first cross-sectional shape is substantially circular; and a second beam body defining a first end, a second end spaced from the first end of the second beam body in the first direction such that the second beam body is elongate along the first direction, the second beam body defining a second cross-sectional shape that lies along the plane, wherein the second cross-sectional shape is substantially circular. Attempts to manufacture cross-car beams with a reduced weight compared to known cross-car beams, for example a steel boxed cross-car beam have included manufacturing a cross-car beam from a high density thermoplastic material. While the use of a high density thermoplastic material may provide a cross-car beam with the strength required for a cross-car beam, the resulting cross-car beam does not provide a significant reduction in weight.

Other attempts to manufacture a cross-car beam with a reduced weight have included manufacturing a cross-car beam from a low density thermoplastic material. While the use of a low density thermoplastic material may provide a cross-car beam with a greatly reduced weight, the strength of the resulting beam may be below the required strength values for a cross-car beam.

Manufacturing a cross-car beam using composite materials including various forms of carbon fiber or glass fiber, as disclosed herein, may provide a cross-car beam with both a reduction in weight compared to an all metallic cross-car beam, and an equal or increased strength compared to an all metallic cross-car beam.

Additional challenges include the manufacturing constraints associated with forming components, such as cross-car beams, from composite materials. For example, some materials can only be manufactured with open cross-sectional shapes. Open cross-sectional shapes, such as a C-shape, may provide reduced strength or bending stiffness compared to a closed cross-sectional shape, such as a box.

Innovative cross-sectional shapes for cross-car beams, combination of a composite component with a metallic component to form a cross-car beam, or both, as disclosed herein, may produce a cross-car beam with a reduced weight and an equal or greater strength compared to an all metallic cross-car beam.

BRIEF DESCRIPTION OF THE DRAWINGS

The foregoing summary, as well as the following detailed description of illustrative aspects of the cross-car beam of the present application, will be better understood when read in conjunction with the appended drawings. For the purposes of illustrating the cross-car beam of the present application, there is shown in the drawings illustrative aspects. It should be understood, however, that the application is not limited to the precise arrangements and instrumentalities shown. In the drawings:

FIG. 1 is an isometric view of a vehicle including a cross-car beam according to one aspect of the disclosure;

FIG. 2A is an isometric view of a cross-car beam according to one aspect of the disclosure;

FIG. 2B is another isometric view of the cross-car beam illustrated in FIG. 2A;

FIG. 2C is a side elevation view of the cross-car beam illustrated in FIG. 2A;

FIG. 3A is an isometric view of a cross-car beam according to another aspect of the disclosure;

FIG. 3B is another isometric view of the cross-car beam illustrated in FIG. 3A;

FIG. 3C is a side elevation view of the cross-car beam illustrated in FIG. 3A;

FIG. 3D is a side elevation view of a cross-car beam according to another aspect of the disclosure;

FIG. 4A is an isometric view of a cross-car beam according to another aspect of the disclosure;

FIG. 4B is another isometric view of the cross-car beam illustrated in FIG. 4A;

FIG. 4C is a side elevation view of the cross-car beam illustrated in FIG. 4A;

FIG. 5A is an isometric view of a cross-car beam according to another aspect of the disclosure;

FIG. 5B is another isometric view of the cross-car beam illustrated in FIG. 5A;

FIG. 5C is a side elevation view of the cross-car beam illustrated in FIG. 5A;

FIG. 6A is an isometric view of a cross-car beam according to another aspect of the disclosure;

FIG. 6B is another isometric view of the cross-car beam illustrated in FIG. 6A;

FIG. 6C is a side elevation view of the cross-car beam illustrated in FIG. 6A.

DETAILED DESCRIPTION OF THE ILLUSTRATIVE ASPECTS

Figure 7:
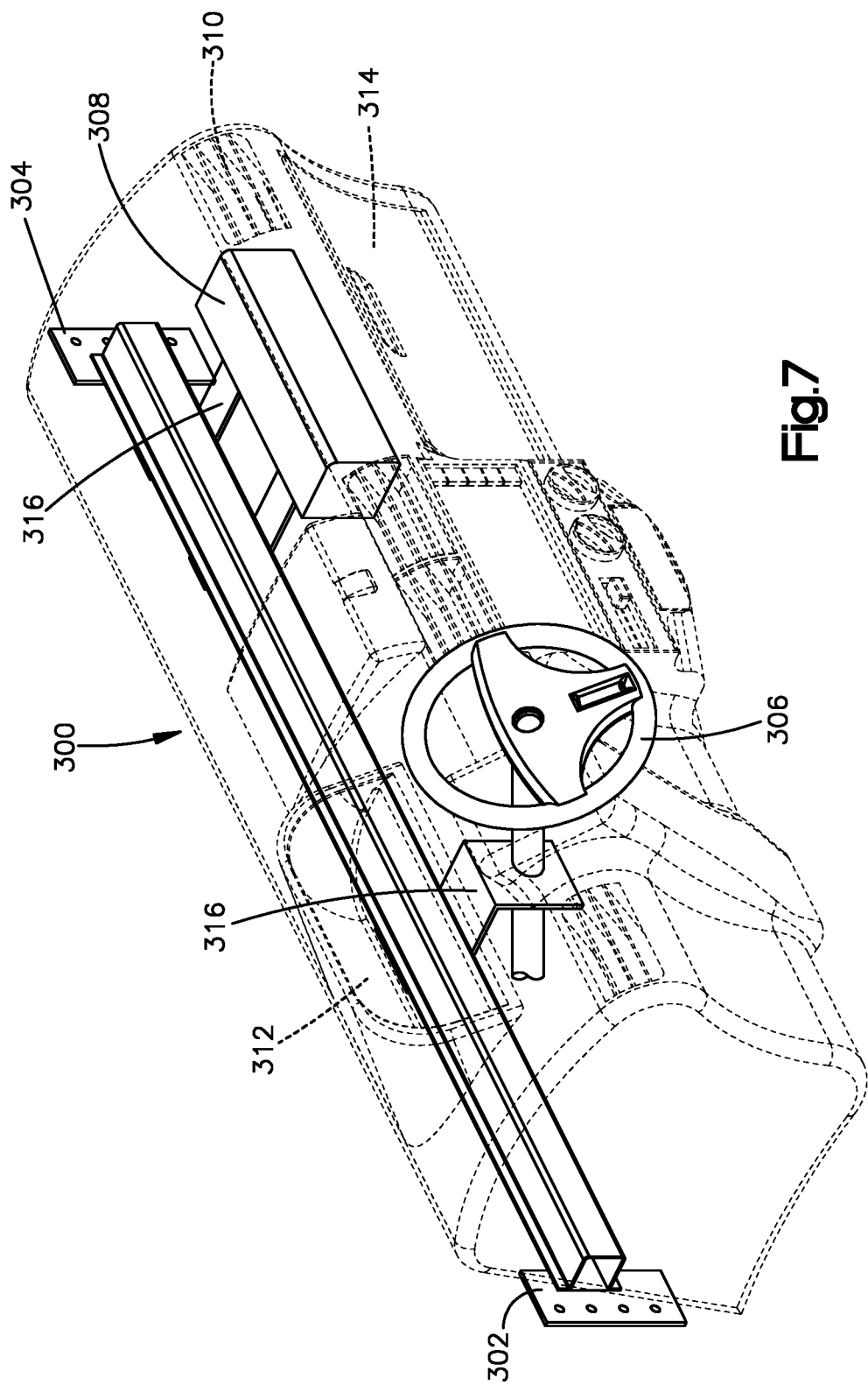
FIG. 7 is an isometric view of a dashboard assembly including a cross-car beam according to one aspect of the disclosure.

Aspects of the disclosure will now be described in detail with reference to the drawings, wherein like reference numbers refer to like elements throughout, unless specified otherwise. Certain terminology is used in the following description for convenience only and is not limiting. The term "plurality", as used herein, means more than one. Certain features of the disclosure which are described herein in the context of separate aspects may also be provided in combination in a single aspect. Conversely, various features of the disclosure that are described in the context of a single aspect may also be provided separately or in any subcombination.

When a range of values is expressed, one aspect includes from the one particular value and/or to the other particular value. Similarly, when values are expressed as approximations, by use of the antecedent "about", it will be understood that the particular value forms another aspect. Further, reference to values stated in ranges includes each and every value within that range. All ranges are inclusive and combinable.

A three dimensional coordinate system is provided and described herein. The three dimensional coordinate system includes a first direction D1, a second direction D2 that is perpendicular to the first direction D1, and a third direction D3 that is perpendicular to both the first direction D1 and the second direction D2. The second direction D2 and the third direction D3 define a plane that is normal to the first direction D1. The term "along", for example "along the first direction", refers to both the direction indicated by the arrow of the first direction D1 and the direction opposite the direction indicated by the arrow of the first direction D1. The term "in", for example "in the first direction", refers only to the direction indicated by the arrow of the first direction D1.

Referring to FIG. 1, a vehicle 10, for example a motor vehicle, defines a longitudinal direction L, a lateral direction A that is perpendicular to the longitudinal direction L, and a transverse direction T that is perpendicular to both the longitudinal direction L and the lateral direction A. The vehicle 10 includes a passenger compartment 12 configured to at least partially enclose one or more passengers, including for example, an operator of the vehicle 10. The vehicle 10 further includes an engine compartment 14 spaced form the passenger compartment 12 along the longitudinal direction L, for example in the longitudinal direction L if the vehicle 10 is a front mounted engine vehicle as shown in the illustrated aspect.

The vehicle 10 further includes a plurality of rigid members connected so as to form a protective shell that at least partially surrounds the passenger compartment 12 of the vehicle 10. The plurality of rigid members may include a plurality of vertical or near vertical supports, that are each elongate along a respective axis that extends along the transverse direction T, referred to as pillars, that are configured to support a roof of the vehicle 10. According to one aspect of the disclosure, the vehicle 10 can include a plurality of pillars, including a pair of A-pillars 16 that hold both sides of a windshield of the vehicle 10 in place. As shown in the illustrated aspect, the pair of A-pillars 16 may be positioned on either side of the passenger compartment 12, such that each of the pair of A-pillars 16 are spaced from one another along the lateral direction L.

As shown in the illustrated aspect, the vehicle 10 includes a plurality of wheels 18 that each are rotatable with respect to both the engine compartment 14. The plurality of wheels 18 may include a front pair of wheels 18a (only one visible) spaced apart along the lateral direction A, a rear pair of wheels 18b (only one visible) spaced apart along the lateral direction A, the front pair of wheels 18a spaced apart from the rear pair of wheels 18b along the longitudinal direction L.

According to one aspect of the disclosure, the vehicle 10 may further include a cross-car beam 20 that is configured to provide support along the lateral direction A between the pair of A-pillars 16. For example, in the event of an impact to the vehicle 10 along the lateral direction A, a side impact, the cross-car beam 20 is configured to provide support in the lateral direction A that resists movement of either or both of the pair of A-pillars 16 toward the other of the pair of A-pillars 16 along the lateral direction A. According to another aspect of the disclosure, the cross-car beam 20 is configured to prevent movement of components from the engine compartment 14 into the passenger compartment 12 along the longitudinal direction L, for example in the event of a head-on impact.

According to one aspect of the disclosure, the cross-car beam 20 has a strength, for example maximum axial load, maximum bending load, or both, higher than any other support member of the vehicle 10 that extends from one side of the vehicle 10 to the opposite side of the vehicle 10 in the lateral direction A.

Referring to FIGS. 2A to 2C, the cross-car beam 20, according to one aspect of the disclosure includes a plastic beam body 22, defining a first end 24 and a second end 26 spaced from the first end 24 along a first direction D1, such that the plastic beam body 22 is elongate in the first direction D1. The plastic beam body 22 further defines a cross-sectional shape 28 along, or in other words defined entirely within, a plane P1 that is normal to the first direction D1.

According to one aspect of the disclosure, the cross-sectional shape 28 defines a first section 30 that is elongate in a second direction D2 that is perpendicular to the first direction D1. The cross-sectional shape 28 further defines a plurality of second sections 32 that each extend from the first section 30 along a direction that is perpendicular to the first direction D1 and angularly offset with respect to the second direction D2.

According to one aspect of the disclosure, adjacent ones of the plurality of second sections 32 each extend from the first section 30 along a third direction D3 that is perpendicular to both the first direction D1 and the second direction D2. As shown in the illustrated aspect, the first section 30 includes a pair of opposed ends 34 spaced from one another along the second direction D2, and the first section 30 is substantially straight between the pair of opposed ends 34, for example from one of the pair of opposed ends 34 to the other of the opposed ends 34. The adjacent ones of the plurality of second sections 32 each extend from one of the pair of opposed ends 34, in a respective direction. As shown in the illustrated aspect, the adjacent ones of the plurality of second sections 32 each extend from one of the pair of opposed ends 34 in the same direction, for example the third direction D3.

According to one aspect of the disclosure, the plastic beam body 22 is configured such that a first of the plurality of second sections 32a and a second of the plurality of second sections 32b are spaced from each another along the second direction D2, are parallel to each other, or both.

According to one aspect of the disclosure, the cross-sectional shape 28 defines a plurality of first sections 30, including a first of the plurality of first sections 30a, a second of the plurality of first sections 30b, and a third of the plurality of first sections 30c. As shown in the illustrated aspect, the third of the plurality of first sections 30c may be spaced from the second of the plurality of first sections 30b along the second direction D2, coplanar with the second of the plurality of first sections 30b, or both. Each of the plurality of first sections 30 may include a respective inner surface 36 and a respective outer surface 38 that is opposite the respective inner surface 36 along the third direction D3.

The cross-sectional shape 28 may define a maximum height H1 measured along a straight line oriented parallel to the second direction D2. According to one aspect, the maximum height H1 is between 30 mm (1.181 inches) (millimeters) and about 100 mm (about 3.937 inches). According to another aspect, the maximum height H1 is between 60 mm (2.362 inches) and 80 mm (3.15 inches). The cross-sectional shape 28 may define a maximum depth D1 measured along a straight line oriented parallel to the third direction D3. According to one aspect, the maximum depth D1 is between 30 mm (1.181 inches) and 100 mm (3.937 inches). According to another aspect, the maximum depth D1 is between 40 mm (1.575 inches) and 60 mm (2.362 inches). According to one aspect, the maximum height H1 is between about 30 mm (about 1.181 inches) and about 100 mm (about 3.937 inches). According to another aspect, the maximum height H1 is between about 60 mm (about 2.362 inches) and about 80 mm (about 3.15 inches). According to another aspect, the maximum height H1 is about 70 mm (about 2.756 inches). The cross-sectional shape 28 may define a maximum depth D1 measured along a straight line oriented parallel to the third direction D3. According to one aspect, the maximum depth D1 is between about 30 mm (about 1.181 inches) and about 100 mm (about 3.937 inches). According to another aspect, the maximum depth D1 is between about 40 mm (about 1.575 inches) and about 60 mm (about 2.362 inches). According to another aspect, the maximum depth D1 is about 50 mm (about 1.969 inches). A value modified by a term or terms, such as "about," is intended to include the degree of error associated with measurement of the particular quantity based upon the equipment available at the time of filing this application.

Each of the plurality of first sections 30 and each of the plurality of second sections 32 may define a thickness T1 measured along a straight line oriented perpendicular to the direction of elongation of the respective section. For example the thickness T1 of each of the plurality of first sections 30 is measured along a straight line oriented parallel to the third direction D3. According to one aspect, the thickness T1 of each of the plurality of first sections 30 and each of the plurality of second sections 32 is between 0.5 mm (0.01969 inch) and 10 mm (0.3937 inch). According to another aspect, the thickness T1 of each of the plurality of first sections 30 and each of the plurality of second sections 32 is between 2 mm (0.07874 inch) and about 3 mm (about 0.1181 inch). According to one aspect, the thickness T1 of each of the plurality of first sections 30 and each of the plurality of second sections 32 is between about 0.5 mm (about 0.01969 inch) and about 10 mm (about 0.3937 inch). According to another aspect, the thickness T1 of each of the plurality of first sections 30 and each of the plurality of second sections 32 is between about 2 mm (about 0.07874 inch) and about 3 mm (about 0.1181 inch). According to another aspect, the thickness T1 of each of the plurality of first sections 30 and each of the plurality of second sections 32 is about 2.5 mm (about 0.09843 inch). The thickness T1 of the cross-sectional shape 28 may be constant across all of the plurality of first sections 30 and the plurality of second sections 32. Alternatively the thickness T1 of each of the plurality of first sections 30 may be constant, the thickness T1 of each of the plurality of second sections 32 may be constant, and the thickness T1 of the plurality of first sections 30 is different than the thickness T1 of each of the plurality of second sections 32. Alternatively, the thickness T1 of each of the sections may be different.

The cross-sectional shape 28, according to one aspect of the disclosure, may be constant from the first end 24 of the plastic beam body 22 to the second end 26 of the plastic beam body 22. Alternatively, the cross-sectional shape 28 may vary between the first end 24 of the plastic beam body 22 and the second end 26 of the plastic beam body 22, such that a size of the cross-sectional shape 28, a shape of the cross-sectional shape 28, or both is different at a first location along the first direction D1 between the first end 24 and the second 26, and a second location spaced from the first location along the first direction D1, the second location between the first end 24 and the second end 26 with respect to the first direction D1.

According to one aspect of the disclosure, the plastic beam body 22 includes an engineered thermoplastic. According to one aspect, the engineered thermoplastic may include a reinforced plastic material. The engineered thermoplastic may include a carbon fiber composite, for example a continuous carbon fiber composite. The carbon fiber composite may include chopped carbon fiber, continuous carbon fiber, or both. The chopped carbon fiber may include short chopped carbon fiber, long chopped carbon fiber, or both. The engineered thermoplastic may include a glass fiber composite. The engineered thermoplastic may include a polymer matrix, for example polyamide 6, polyamide 66, or a polyphenylene oxide polyamide blend. The engineered thermoplastic may include polyamide 66 reinforced with a percentage, for example between about 20 percent (percent weight (wt %)) and about 40 percent, of short carbon fiber. The engineered thermoplastic may include polypropylene reinforced with a percentage, for example between about 40 percent and about 60 percent, of long glass fiber. As shown in the illustrated aspect, the plastic beam body 22 may be monolithic. Alternatively, the plastic beam body 22 may include multiple pieces joined together. The monolithic or multiple piece plastic beam body 22 may be thermoformed, injection molded, injection compression molded, compression formed, extruded, or formed using any other method known in the art.

The cross-car beam 20, according to one aspect of the disclosure, may further include a metallic beam body 42 configured to be coupled to the plastic beam body 22. The metallic beam body 42 defining a first end 44 and a second end 46 spaced from the first end 44 along a direction, for example the first direction D1 when the metallic beam body 42 is coupled to the plastic beam body 22, such that the metallic beam body 42 is elongate in the first direction D1.

The metallic beam body 42 further defines a cross-sectional shape 48 along a plane, for example the plane P1 when the metallic beam body 42 is coupled to the plastic beam body 22. As shown in the illustrated aspect, the cross-sectional shape 48 defines a first section 50 that is elongate in a direction, for example the second direction D2 when the metallic beam body 42 is coupled to the plastic beam body 22. The cross-sectional shape 48 of the metallic beam body 42 may be devoid of any other sections. In another aspect, the cross-sectional shape 48 of the metallic beam body 42 may include other sections. The metallic beam body 42 includes an inner surface 56 that faces the plastic beam body 22, for example the respective inner surfaces 36 of the plastic beam body 22, when the metallic beam body 42 is coupled to the plastic beam body 22, and an outer surface 58 opposite the inner surface 56 such that the outer surface 58 faces away from the plastic beam body 22 when the metallic beam body 42 is coupled to the plastic beam body 22.

The cross-sectional shape 48 may define a maximum height H2 measured along a straight line oriented parallel to the second direction D2. According to one aspect, the maximum height H2 is between 30 mm (1.181 inches) and 100 mm (3.937 inches). According to another aspect, the maximum height H2 is between 60 mm (2.362 inches) and 80 mm (3.15 inches). According to one aspect, the maximum height H2 is between about 30 mm (about 1.181 inches) and about 100 mm (about 3.937 inches). According to another aspect, the maximum height H2 is between about 60 mm (about 2.362 inches) and about 80 mm (about 3.15 inches). According to another aspect, the maximum height H2 is about 70 mm (about 2.756 inches). According to one aspect, the maximum height H2 is equal to the maximum height H1. According to another aspect, the maximum height H2 is different, for example less than or greater than the maximum height H1.

The cross-sectional shape 48, for example the first section 50 may define a thickness T2 measured along a straight line oriented perpendicular to the direction of elongation of the first section 50. For example the thickness T2 of the first section 50 may be measured along a straight line oriented parallel to the third direction D3. According to one aspect, the thickness T2 of the first section 50 is between 0.1 mm (0.003937 inch) and 2 mm (0.07874 inch). According to another aspect, the thickness T2 of the first section 50 is between 0.25 mm (0.009843 inch) 0.75 mm (0.02953 inch). According to one aspect, the thickness T2 of the first section 50 is between about 0.1 mm (about 0.003937 inch) and about 2 mm (about 0.07874 inch). According to another aspect, the thickness T2 of the first section 50 is between about 0.25 mm (about 0.009843 inch) and about 0.75 mm (about 0.02953 inch). According to another aspect, the thickness T2 of the first section 50 is about 0.5 mm (about 0.01969 inch). According to one aspect, the thickness T2 is less than the thickness T1. According to another aspect, the thickness T2 is greater than or equal to the thickness T1. The thickness T2 of the cross-sectional shape 48 may be constant or may vary.

The cross-sectional shape 48, according to one aspect of the disclosure, may be constant from the first end 44 of the metallic beam body 42 to the second end 46 of the metallic beam body 42. Alternatively, the cross-sectional shape 48 may vary between the first end 44 of the metallic beam body 42 and the second end 46 of the metallic beam body 42, such that a size of the cross-sectional shape 48, a shape of the cross-sectional shape 48, or both is different at a first location along the first direction D1 between the first end 44 and the second end 46, and a second location spaced from the first location along the first direction D1, the second location between the first end 44 and the second end 46 with respect to the first direction D1.

According to one aspect of the disclosure, the metallic beam body 42 includes steel, magnesium, aluminum, or any combination thereof. As shown in the illustrated aspect, the metallic beam body 42 may be monolithic. Alternatively, the metallic beam body 42 may include multiple pieces joined together.

The metallic beam body 42 may be coupled to the plastic beam body 22 by using any technique known in the art to couple a plastic component and a metallic component. For example, as shown in FIGS. 2A to 2C, the cross-car beam 20 may include a plurality of fasteners 60, for example bolts, screws, rivets, or any other fastener known in the art. The cross-car beam 20 may further include a first plurality of apertures 62, defined by the plastic beam body 22 for example, and a second plurality of apertures 64, defined by the metallic beam body 42 for example. As shown in FIG. 2C, the plastic beam body 22 is coupled to the metallic beam body 42 by aligning each of the first plurality of apertures 62 with a respective one of the plurality of second apertures 64 and inserting a respective one of the plurality of fasteners 60 through each pair of the aligned first and second plurality of apertures 62 and 64. According to one aspect of the disclosure, the first plurality of apertures 62 are defined by the second of the plurality of first sections 30*b* and the third of the plurality of first sections 30*c*.

Referring to FIGS. 3A to 3C, the cross-car beam 20 may include an adhesive, for example a structural adhesive, that couples the plastic beam body 22 to the metallic beam body 42. According to one aspect of the disclosure, the adhesive may be applied to the second of the plurality of first sections 30*b*, the third of the plurality of first sections 30*c*, and the inner surface 56. As shown, the cross-car beam 20 may be devoid of fasteners. Alternatively, the cross-car beam 20 may include both the adhesive, and a plurality of fasteners, a first plurality of apertures, and a second plurality of apertures.

Referring to FIG. 3D, the cross-car beam 20 may include the plastic beam body 22 overmolded the metallic beam body 42. As shown, the cross-car beam 20 may be devoid of fasteners, devoid of adhesive, or devoid of both. Alternatively, the cross-car beam 20 may include the plastic beam body 22 overmolded the metallic beam body 42 in addition to fasteners, adhesive, or both.

Referring to FIGS. 2A to 3D, the metallic beam body 42 may be coupled to the plastic beam body 22 according to any technique known in the art suitable to connect plastic and metallic bodies. For example, the metallic beam body 42 may be coupled to the plastic beam body 22 by ultrasonic welding, or heat staking.

Referring to FIGS. 1 to 3D, according to one aspect of the disclosure, the cross-car beam 20 may configured to be positioned in the vehicle 10 between the engine compartment 14 and the passenger compartment 12 such that the metallic beam body 42 faces the engine compartment 14. Alternatively, the cross-car beam 20 may be configured to be positioned within the vehicle 10 such that the plastic beam body 22 faces the engine compartment 14.

Referring to FIGS. 4A to 4C, the cross-car beam 20 may include a plurality of inserts 66 in addition to the first plurality of apertures 62. As shown in FIG. 4C, the plurality of inserts 66 are carried by, for example coupled to the plastic beam body 22, such that the plurality of inserts 66 and the plastic beam body 22 cooperatively define the first plurality of apertures 62. Each of the first plurality of apertures 62 may extend through one of the plurality of inserts 66 and through one of the plurality of first sections 30, for example the first of the plurality of first sections 30*a*. The first plurality of apertures 62 are configured to facilitate connecting components to the cross-car beam 20. In accordance with one aspect, the first plurality of apertures 62 are each configured to receive a fastener that couples a bracket to the cross-car beam 20. The bracket may be configured to couple a component, for example a steering column, to the cross-car beam 20, thereby assembling a dashboard assembly as will be described in greater detail below.

In accordance with another aspect of the disclosure, the plurality of inserts 66 are carried by, for example coupled to the metallic beam body 42, such that the plurality of inserts 66 and the metallic beam body 42 cooperatively define the first plurality of apertures 62 configured to facilitate connecting components to the cross-car beam 20.

Referring to FIGS. 2A to 2C, the cross-car beam 20 may further include an opening 80 that is elongate along the first direction D1, the opening partially defined by the plastic beam body 22, and partially defined by the metallic beam body 42, such that the opening 80 is entirely enclosed with respect to all directions perpendicular to the first direction D1 at a location along the first direction D1. The opening 80 may be configured to provide an enclosed passage for wires of a component configured to be coupled to the cross-car beam 20, portions of an HVAC system, or both.

Referring to FIGS. 5A to 5C, a cross-car beam 120 according to one aspect of the disclosure, includes a plastic beam body 122, that defines a first end 124, a second end 126 spaced from the first end 124 in a first direction D1, such that the plastic beam body 122 is elongate along the first direction D1. The plastic beam body 122 further defines a cross-sectional shape 128 along, or in other words defined entirely within, a plane P1 that is normal to the first direction D1.

According to one aspect of the disclosure, the cross-sectional shape 128 defines a first section 130 that is elongate in a second direction D2 that is perpendicular to the first direction D1. The cross-sectional shape 128 further defines a plurality of second sections 132 that each extend from the first section 130 along a respective direction that is perpendicular to the first direction D1 and angularly offset with respect to the second direction D2.

As shown in the illustrated aspect, the cross-car beam 120 includes at least one opening 180 that extends from the first end 124 to the second end 126 along first direction D1, such that the opening 180 is elongate along the first direction D1. According to one aspect of the disclosure, the opening 180 is partially defined by the first section 130 and the plurality of second sections 132 such that the opening 180 is open to at least one direction that is perpendicular to the first direction D1. The cross-car beam 120 may be devoid of a metallic beam body, for example a metallic beam body that partially encloses the opening 180. In one aspect, the cross-car beam 120 may include a metallic beam body, for example a metallic beam body that partially encloses the opening 180.

According to one aspect of the disclosure, adjacent ones of the plurality of second sections 132 each extend from the first section 130 along a third direction D3 that is perpendicular to both the first direction D1 and the second direction D2. The opening 180 may be open along the third direction D3. As shown in the illustrated aspect, the first section 130 includes a pair of opposed ends 134 spaced from one another along the second direction D2, and the first section 130 is substantially straight between the pair of opposed ends 134, for example from one of the pair of opposed ends 134 to the other of the opposed ends 134. The adjacent ones of the plurality of second sections 132 each extend from one of the pair of opposed ends 134, in a respective direction. As shown in the illustrated aspect, the adjacent ones of the plurality of second sections 132 each extend from one of the pair of opposed ends 134 in the same direction, for example the third direction D3.

According to one aspect of the disclosure, the plastic beam body 122 is configured such that a first of the plurality of second sections 132*a* and a second of the plurality of second sections 132*b* are spaced from each another along the second direction D2, are parallel to each other, or both. The plurality of second sections 132 can include between about 2 second sections 132 and about 8 second sections 132, for example about 6 second sections. According to one aspect of the disclosure, the plastic beam body 122 is configured such that each of the plurality of second sections 132 are spaced from each another along the second direction D2, are parallel to each other, or both.

According to one aspect of the disclosure, the cross-sectional shape 128 defines a plurality of first sections 130, including a first of the plurality of first sections 130a, a second of the plurality of first sections 130b, a third of the plurality of first sections 130c, a fourth of the plurality of first sections 130d, a fifth of the plurality of first sections 130e, or any combination thereof. As shown in the illustrated aspect, the first, third, and fifth of the plurality of first sections 130a, 130c, and 130e may be spaced from the each other along the second direction D2, coplanar with each other, or both. As shown in the illustrated aspect, the second and fourth of the plurality of first sections 130b and 130d may be spaced from the each other along the second direction D2, coplanar with each other, or both. Each of the plurality of first sections 130 may include a respective inner surface 136 and a respective outer surface 138 that is opposite the respective inner surface 136 along the third direction D3.

The cross-sectional shape 128, according to one aspect of the disclosure, may be constant from the first end 124 of the plastic beam body 122 to the second end 126 of the plastic beam body 122. Alternatively, the cross-sectional shape 128 may vary between the first end 124 of the plastic beam body 122 and the second end 126 of the plastic beam body 122, such that a size of the cross-sectional shape 128, a shape of the cross-sectional shape 128, or both is different at a first location along the first direction D1 between the first end 124 and the second 126, and a second location spaced from the first location along the first direction D1, the second location between the first end 124 and the second end 126 with respect to the first direction D1.

According to one aspect of the disclosure, the plastic beam body 122 includes an engineered thermoplastic. According to one aspect, the engineered thermoplastic may include a reinforced plastic material. The engineered thermoplastic may include a carbon fiber composite, for example a continuous carbon fiber composite. The carbon fiber composite may include chopped carbon fiber, continuous carbon fiber, or both. The chopped carbon fiber may include short chopped carbon fiber, long chopped carbon fiber, or both. The engineered thermoplastic may include a glass fiber composite. The engineered thermoplastic may include a polymer matrix, for example polyamide 6, polyamide 66, or a polyphenylene oxide polyamide blend. The engineered thermoplastic may include polyamide 66 reinforced with a percentage, for example between about 20 percent and about 40 percent, of short carbon fiber. The engineered thermoplastic may include polypropylene reinforced with a percentage, for example between about 40 percent and about 60 percent, of long glass fiber. As shown in the illustrated aspect, the plastic beam body 122 may be monolithic. Alternatively, the plastic beam body 122 may include multiple pieces joined together. The monolithic or multiple piece plastic beam body 122 may be thermoformed, injection molded, injection compression molded, compression formed, extruded, or formed using any other method known in the art.

The cross-sectional shape 128 may define a maximum height H1 measured along a straight line oriented parallel to the second direction D2. According to one aspect, the maximum height H1 is between 25 mm (0.9843 inch) and 100 mm (3.937 inches). According to another aspect, the maximum height H1 is between 40 mm (1.575 inches) and 60 mm (2.362 inches). According to one aspect, the maximum height H1 is between about 25 mm (about 0.9843 inch) and about 100 mm (about 3.937 inches). According to another aspect, the maximum height H1 is between about 40 mm (about 1.575 inches) and about 60 mm (about 2.362 inches). According to another aspect, the maximum height H1 is about 50 mm (about 1.969 inches). The cross-sectional shape 28 may define a maximum depth D1 measured along a straight line oriented parallel to the third direction D3. According to one aspect, the maximum depth D1 is between 15 mm (0.5906 inch) and 100 mm (3.937 inches). According to another aspect, the maximum depth D1 is between 40 mm (1.575 inches) and 60 mm (2.362 inches). According to one aspect, the maximum depth D1 is between about 15 mm (about 0.5906 inch) and about 100 mm (about 3.937 inches). According to another aspect, the maximum depth D1 is between about 40 mm (about 1.575 inches) and about 60 mm (about 2.362 inches). According to another aspect, the maximum depth D1 is about 50 mm (about 1.969 inches). According to one aspect, the maximum height H1 is equal to the maximum depth D1. According to another aspect, the maximum height H1 is different than the maximum depth D1.

Each of the plurality of first sections 130 and each of the plurality of second sections 132 may define a thickness T1 measured along a straight line oriented perpendicular to the direction of elongation of the respective section. For example the thickness T1 of each of the plurality of first sections 130 is measured along a straight line oriented parallel to the third direction D3. According to one aspect, the thickness T1 of each of the plurality of first sections 130 and each of the plurality of second sections 132 is between 0.5 mm (0.01969 inch) and 10 mm (0.3937 inch). According to another aspect, the thickness T1 of each of the plurality of first sections 130 and each of the plurality of second sections 132 is between 2 mm (0.07874 inch) and 3 mm (0.1181 inch). According to one aspect, the thickness T1 of each of the plurality of first sections 130 and each of the plurality of second sections 132 is between about 0.5 mm (about 0.01969 inch) and about 10 mm (about 0.3937 inch). According to another aspect, the thickness T1 of each of the plurality of first sections 130 and each of the plurality of second sections 132 is between about 2 mm (about 0.07874 inch) and about 3 mm (about 0.1181 inch). According to another aspect, the thickness T1 of each of the plurality of first sections 130 and each of the plurality of second sections 132 is about 2.5 mm (about 0.09843 inch). The thickness T1 of the cross-sectional shape 128 may be constant across all of the plurality of first sections 130 and the plurality of second sections 132. Alternatively the thickness T1 of each of the plurality of first sections 130 may be constant, the thickness T1 of each of the plurality of second sections 132 may be constant, and the thickness T1 of the plurality of first sections 130 is different than the thickness T1 of each of the plurality of second sections 132. Alternatively, the thickness T1 of each of the sections may be different.

Referring to FIGS. 6A to 6C, a cross-car beam 220, according to one aspect of the disclosure, includes a first beam body 222, that defines a first end 224, a second end 226 spaced from the first end 224 in a first direction D1 such that the first beam body 222 is elongate along the first direction D1. The first beam body 222 defines a first cross-sectional shape 228 that lies along, or in other words defined entirely within, a plane P1 that is normal to the first direction D1. As shown in the illustrated aspect, the first cross-sectional shape 228 is substantially circular, for example a circle.

The cross-car beam 220, according to one aspect of the disclosure, may further include a second beam body 242 that is coupled to the first beam body 222. The second beam body 242 defines a first end 244, a second end 246 spaced from the first end 244 in the first direction D1 such that the second beam body 242 is elongate along the first direction D1. The second beam body 242 defines a second cross-sectional shape 248 that lies along the plane P1. As shown in the illustrated aspect, the second cross-sectional shape 248 is substantially circular, for example a circle.

The first beam body 222 includes a first material, and the second beam body 242 includes a second material. According to one aspect of the disclosure, the first material is different than the second material.

According to one aspect of the disclosure, the first beam body 222 includes an engineered thermoplastic. According to one aspect, the engineered thermoplastic may include a reinforced plastic material. The engineered thermoplastic may include a carbon fiber composite, for example a continuous carbon fiber composite. The carbon fiber composite may include chopped carbon fiber, continuous carbon fiber, or both. The chopped carbon fiber may include short chopped carbon fiber, long chopped carbon fiber, or both. The engineered thermoplastic may include a glass fiber composite. The engineered thermoplastic may include a polymer matrix, for example polyamide 6, polyamide 66, or a polyphenylene oxide polyamide blend. The engineered thermoplastic may include polyamide 66 reinforced with a percentage, for example between about 20 percent and about 40 percent, of short carbon fiber. The engineered thermoplastic may include polypropylene reinforced with a percentage, for example between about 40 percent and about 60 percent, of long glass fiber. As shown in the illustrated aspect, the first beam body 222 may be monolithic. Alternatively, the first beam body 222 may include multiple pieces joined together. The monolithic or multiple piece first beam body 222 may be thermoformed, injection molded, injection compression molded, compression formed, extruded, or formed using any other method known in the art.

According to one aspect of the disclosure, the second beam body 242 includes a carbon or glass fabric laminate.

According to one aspect of the disclosure, the cross-car beam 220 may further include a third beam body 282, that defines a first end 284, a second end 286 spaced from the first end 284 in a first direction D1 such that the third beam body 282 is elongate along the first direction D1. The third beam body 282 defines a third cross-sectional shape 288 that lies along the plane P1. As shown in the illustrated aspect, the third cross-sectional shape 288 is substantially circular, for example a circle.

According to one aspect of the disclosure, at least two of the first cross-sectional shape 228, the second cross-sectional shape 248, and the third cross-sectional shape 288 are concentric, for example concentric circles. The third beam body 282 may include a third material that is identical to the first material.

According to one aspect of the disclosure, the third beam body 282 includes an engineered thermoplastic. According to one aspect, the engineered thermoplastic may include a reinforced plastic material. The engineered thermoplastic may include a carbon fiber composite, for example a continuous carbon fiber composite. The carbon fiber composite may include chopped carbon fiber, continuous carbon fiber, or both. The chopped carbon fiber may include short chopped carbon fiber, long chopped carbon fiber, or both. The engineered thermoplastic may include a glass fiber composite. The engineered thermoplastic may include a polymer matrix, for example polyamide 6, polyamide 66, or a polyphenylene oxide polyamide blend. The engineered thermoplastic may include polyamide 66 reinforced with a percentage, for example between about 20 percent and about 40 percent, of short carbon fiber. The engineered thermoplastic may include polypropylene reinforced with a percentage, for example between about 40 percent and about 60 percent, of long glass fiber. As shown in the illustrated aspect, the third beam body 282 may be monolithic. Alternatively, the third beam body 282 may include multiple pieces joined together. The monolithic or multiple piece third beam body 282 may be thermoformed, injection molded, injection compression molded, compression formed, extruded, or formed using any other method known in the art.

According to one aspect of the disclosure, at least one of, for example all three of, the first, second, and third cross-sectional shapes 228, 248, and 288, may be constant from the respective first end 224, 244, and 284 to the respective second end 226, 246, and 286. Alternatively, the cross-sectional shape of at least one of, for example all three of, the first, second, and third cross-sectional shapes 228, 248, and 288, may vary between the respective first end 224, 244, and 284 and the respective second end 226, 246, and 286, such that a size, a shape, or both of the first, second, and third cross-sectional shapes 228, 248, and 288 is different at a first location along the first direction D1 between the respective first end 224, 244, and 284 and the respective second end 226, 246, and 286.

The cross-car beam 220 may define a maximum height H1 measured along a straight line oriented parallel to the second direction D2. According to one aspect, the maximum height H1 is between 25 mm (0.9843 inch) and 100 mm (3.937 inches). According to another aspect, the maximum height H1 is between 40 mm (1.575 inches) and 60 mm (2.362 inches). According to another aspect, the maximum height H1 is 50 mm (1.969 inches). The cross-car beam 220 may define a maximum depth D1 measured along a straight line oriented parallel to the third direction D3. According to one aspect, the maximum depth D1 is between 15 mm (0.5906 inch) and 100 mm (3.937 inches). According to another aspect, the maximum depth D1 is between 40 mm (1.575 inches) and 60 mm (2.362 inches). According to another aspect, the maximum depth D1 is 50 mm (1.969 inches). According to one aspect, the maximum height H1 is between about 25 mm (about 0.9843 inch) and about 100 mm (about 3.937 inches). According to another aspect, the maximum height H1 is between about 40 mm (about 1.575 inches) and about 60 mm (about 2.362 inches). According to another aspect, the maximum height H1 is about 50 mm (about 1.969 inches). The cross-car beam 220 may define a maximum depth D1 measured along a straight line oriented parallel to the third direction D3. According to one aspect, the maximum depth D1 is between about 15 mm (about 0.5906 inch) and about 100 mm (about 3.937 inches). According to another aspect, the maximum depth D1 is between about 40 mm (about 1.575 inches) and about 60 mm (about 2.362 inches). According to another aspect, the maximum depth D1 is about 50 mm (about 1.969 inches). According to one aspect, the maximum height H1 is equal to the maximum depth D1. According to another aspect, the maximum height H1 is different than the maximum depth D1.

The first beam body 222 may define a first thickness T1 measured along a straight line oriented perpendicular to the direction of elongation of the respective section. For example the first thickness T1 of the first beam body 222 is measured along a straight line oriented parallel to the third direction D3. According to one aspect, the first thickness T1 of the first beam body 222 is between 0.5 mm (0.01969 inch) and 10 mm (0.3937 inch). According to another aspect, the first thickness T1 of the first beam body 222 is between 1 mm (0.03937 inch) and 3 mm (0.1181 inch). According to one aspect, the first thickness T1 of the first beam body 222 is between about 0.5 mm (about 0.01969 inch) and about 10 mm (about 0.3937 inch). According to another aspect, the first thickness T1 of the first beam body 222 is between about 1 mm (about 0.03937 inch) and about 3 mm (about 0.1181 inch). According to another aspect, the first thickness T1 of the first beam body 222 is about 2 mm (about 0.07874 inch). The first thickness T1 may be constant along the plane P1 or may vary along the plane P1.

The second beam body 242 may define a second thickness T2 measured along a straight line oriented perpendicular to the direction of elongation of the respective section. For example the second thickness T2 of the second beam body 242 is measured along a straight line oriented parallel to the third direction D3. According to one aspect, the second thickness T2 of the second beam body 242 is between 0.1 mm (0.003937 inch) and 5 mm (0.1969 inch). According to another aspect, the second thickness T2 of the second beam body 242 is between 0.5 mm (0.1969 inch) and 1.5 mm (0.05906 inch). According to one aspect, the second thickness T2 of the second beam body 242 is between about 0.1 mm (about 0.003937 inch) and about 5 mm (about 0.1969 inch). According to another aspect, the second thickness T2 of the second beam body 242 is between about 0.5 mm (about 0.01969 inch) and about 1.5 mm (about 0.05906 inch). According to another aspect, the second thickness T2 of the second beam body 242 is about 1 mm (about 0.03937 inch). The second thickness T2 may be constant along the plane P1 or may vary along the plane P1. According to one aspect, the second thickness T2 is different than the first thickness T1. According to another aspect, the second thickness T2 is equal to the first thickness T1.

The third beam body 282 may define a third thickness T3 measured along a straight line oriented perpendicular to the direction of elongation of the respective section. For example the third thickness T3 of the third beam body 282 is measured along a straight line oriented parallel to the third direction D3. According to one aspect, the third thickness T3 of the third beam body 282 is between 0.5 mm (0.01969 inch) and 10 mm (0.3937 inch). According to another aspect, the third thickness T3 of the third beam body 282 is between 1 mm (0.03937 inch) and 3 mm (0.1181 inch). According to one aspect, the third thickness T3 of the third beam body 282 is between about 0.5 mm (about 0.01969 inch) and about 10 mm (about 0.3937 inch). According to another aspect, the third thickness T3 of the third beam body 282 is between about 1 mm (about 0.03937 inch) and about 3 mm (about 0.1181 inch). According to another aspect, the third thickness T3 of the third beam body 282 is about 2 mm (about 0.07874 inch). The third thickness T3 may be constant along the plane P1 or may vary along the plane P1. According to one aspect, the third thickness T3 is equal to the first thickness T1. According to another aspect, the third thickness T3 is different than the first thickness T1.

According to one aspect of the disclosure, the cross-car beam 220 may be formed by extruding the first beam body 222, then weaving the second beam body 242 onto the first beam body 222 to couple the second beam body 242 to the first beam body 222, and then extruding the third beam body 282 over the coupled first and second beam bodies 222 and 242.

Referring to FIGS. 1 and 7, a dashboard assembly 300 is configured to be inserted into the vehicle 10, between the A-pillars 16 with respect to the lateral direction A, and between the passenger compartment 12 and the engine compartment 14 with respect to the longitudinal direction L. According to one aspect of the disclosure, the dashboard assembly 300 may include one or more of the cross-car beam 20, the cross-car beam 120, the cross-car beam 220, or any combination thereof (hereinafter the cross-car beam 20).

The dashboard assembly 300 may include a first coupling mechanism 302 configured to couple the cross-car beam 20 to one of the A-pillars 16. The dashboard assembly 300 may further include a second coupling mechanism 304 configured to couple the cross-car beam 20 to the other of the A-pillars 16. According to one aspect of the disclosure the first coupling mechanism 302, the second coupling mechanism 304, or both includes a bracket. The dashboard assembly 300 may further include a steering column 306, an airbag deployment assembly 308, an HVAC assembly 310, an instrument panel 312, a glove box 314, or any combination thereof. The dashboard assembly 300 may further include a plurality of brackets 316, each of the plurality of brackets 316 coupled to both the cross-car beam 20 and at least one of the steering column 306, the airbag deployment assembly 308, the HVAC assembly 310, the instrument panel 312, and the glove box 314.

It will be appreciated by those skilled in the art that changes could be made to the aspects described above without departing from the broad inventive concept thereof. It is understood, therefore, that this disclosure is not limited to the particular aspects disclosed, but it is intended to cover modifications within the spirit and scope of the present disclosure as defined by the claims.

LIST OF EXAMPLES

A non-exhaustive list of examples of aspects of the cross-car beam described above is provided below, in addition to aspects of a dashboard assembly including the cross-car beam, and aspects of a vehicle including the cross-car beam.

Example 1

A cross-car beam comprising: a plastic beam body that defines a first end, a second end spaced from the first end in a first direction, such that the plastic beam body is elongate along the first direction, wherein the plastic beam body defines a cross-sectional shape along a plane normal to the first direction, wherein the cross-sectional shape defines: 1) a first section that is elongate in a second direction that is perpendicular to the first direction, and 2) a plurality of second sections that are each elongate along a third direction that is perpendicular to both the first direction and the second direction.

Example 2

The cross-car beam of example 1, wherein adjacent ones of the plurality of second sections each extend from the first section in the third direction.

Example 3

The cross-car beam of example 2, wherein the adjacent ones of the plurality of second sections each extend from one of a pair of opposed ends of the first section along the third direction.

Example 4

The cross-car beam of example 3, wherein the first section is straight between the pair of opposed ends along the second direction.

Example 5

The cross-car beam of any one of examples 3 and 4, wherein the adjacent ones of the plurality of second sections each extend from one of the pair of opposed ends of the first section in the same direction.

Example 6

The cross-car beam of any one of examples 1 to 5, wherein the first section is a first of a plurality of first sections, the cross-sectional shape defines a second of the plurality of first sections, and the cross-sectional shape further defines a third of the plurality of first sections that: 1) is spaced from the second of the plurality of first sections along the second direction, and 2) is coplanar with the second of the plurality of first sections.

Example 7

The cross-car beam of any one of examples 1 to 6, wherein a first of the plurality of second sections and a second of the plurality of second sections: 1) are spaced from each another along the second direction, and 2) are parallel to each other.

Example 8

The cross-car beam of any one of examples 1 to 7, wherein the plastic beam body includes a reinforced plastic material.

Example 9

The cross-car beam of example 8, wherein the reinforced plastic material includes a carbon fiber composite.

Example 10

The cross-car beam of example 9, wherein the carbon fiber composite includes at least one of chopped carbon fiber and continuous carbon fiber.

Example 11

The cross-car beam of example 9, wherein the carbon fiber composite includes 40 percent short carbon fiber reinforced polyamide 66.

Example 12

The cross-car beam of any one of examples 1 to 11, wherein the plastic beam body is monolithic.

Example 13

The cross-car beam of any one of examples 1 to 12, further comprising an opening that extends from the first end to the second end along the first direction, the opening at least partially defined by the plastic beam body.

Example 14

The cross-car beam of example 13, wherein the cross-car beam is devoid of a metallic beam body that partially defines the opening.

Example 15

The cross-car beam of any one of examples 6 to 14, wherein the plurality of first sections includes at least three sections that each: 1) are spaced from one another along the second direction, and 2) are coplanar with each other.

Example 16

The cross-car beam of any one of examples 1 to 15, wherein the plurality of second sections includes at least four sections that each: 1) are spaced from one another along the second direction, and 2) are parallel to each other.

Example 17

The cross-car beam of any one of examples 1 to 12, further comprising: a metallic beam body coupled to the plastic beam body, such that an inner surface of the metallic beam body faces the plastic beam body, and an outer surface of the metallic beam body that is opposite the inner surface faces away from the plastic beam body.

Example 18

The cross-car beam of example 17, wherein the metallic beam body defines a first end, a second end spaced form the first end of the metallic beam body in the first direction such that the metallic beam body is elongate along the first direction.

Example 19

The cross-car beam of any one of examples 17 to 18, further comprising an opening that extends from the first end to the second end along the first direction, the opening partially defined by the plastic beam body and partially defined by the metallic beam body.

Example 20

The cross-car beam of any one of examples 17 to 19, wherein the metallic beam body includes steel.

Example 21

The cross-car beam of any one of examples 17 to 20, further comprising an adhesive coupling the metallic beam body to the plastic beam body.

Example 22

The cross-car beam of any one of examples 17 to 21, further comprising a plurality of fasteners, wherein the plastic beam body defines a first plurality of apertures, the metallic beam body defines a second plurality of apertures, and each of the plurality of fasteners is inserted through one of the first plurality of apertures and one of the second plurality of apertures to couple the metallic beam body to the plastic beam body.

Example 23

The cross-car beam of any one of examples 17 to 22, further comprising a plurality of inserts coupled to one of the plastic beam body and the metallic beam body, the plurality of inserts partially defining a first plurality of apertures, and the one of the plastic beam body and the metallic beam body partially defining the first plurality of apertures, wherein each of the first plurality of apertures is configured to receive one of a plurality of fasteners to couple a component to the cross-car beam.

Example 24

The cross-car beam of any one of examples 17 to 23, wherein the metallic beam body is monolithic.

Example 25

A cross-car beam comprising: a plastic beam body that defines a first end, a second end spaced from the first end in a first direction, such that the plastic beam body is elongate along the first direction, the plastic beam body defining a cross-sectional shape along a plane normal to the first direction, wherein the cross-sectional shape defines: 1) a first section that is elongate in a second direction that is perpendicular to the first direction, and 2) a plurality of second sections that each extend from the first section along a respective direction that is offset with respect to the second direction; wherein the cross-car beam includes an opening that extends from the first end to the second end along first direction, the opening partially defined by the first section and the plurality of second sections such that the opening is open to at least one direction that is perpendicular to the first direction.

Example 26

The cross-car beam of example 25, wherein adjacent ones of the plurality of second sections each extend from one of a pair of opposed ends of the first section.

Example 27

The cross-car beam of example 26, wherein the adjacent ones of the plurality of second sections each extend from the first section in a third direction that is perpendicular to both the first direction and the second direction, such that the adjacent ones of the plurality of second sections are each elongate along the third direction.

Example 28

The cross-car beam of example 27, wherein the opening is open along the third direction.

Example 29

The cross-car beam of any one of examples 26 to 28, wherein the first section is straight between the pair of opposed ends along the second direction.

Example 30

The cross-car beam of any one of examples 26 to 29, wherein the adjacent ones of the plurality of second sections each extend from one of the pair of opposed ends of the first section in the same direction.

Example 31

The cross-car beam of any one of examples 25 to 30, wherein the first section is a first of a plurality of first sections, the cross-sectional shape defines a second of the plurality of first sections, and the cross-sectional shape further defines a third of the plurality of first sections that: 1) is spaced from the second of the plurality of first sections along the second direction, and 2) is coplanar with the second of the plurality of first sections.

Example 32

The cross-car beam of any one of examples 25 to 31, wherein a first of the plurality of second sections and a second of the plurality of second sections: 1) are spaced from each another along the second direction, and 2) are parallel to each other.

Example 33

The cross-car beam of any one of examples 25 to 32, wherein the plastic beam body includes a reinforced plastic material.

Example 34

The cross-car beam of example 33, wherein the reinforced plastic material includes a carbon fiber composite.

Example 35

The cross-car beam of example 34, wherein the carbon fiber composite includes at least one of chopped carbon fiber and continuous carbon fiber.

Example 36

The cross-car beam of example 34, wherein the carbon fiber composite includes 40 percent short carbon fiber reinforced polyamide 66.

Example 37

The cross-car beam of any one of examples 25 to 36, wherein the plastic beam body is monolithic.

Example 38

The cross-car beam of any one of examples 25 to 37, wherein the cross-car beam is devoid of a metallic beam body that partially defines the opening.

Example 39

The cross-car beam of any one of examples 31 to 38, wherein the plurality of first sections includes at least three sections that each: 1) are spaced from one another along the second direction, and 2) are coplanar with each other.

Example 40

The cross-car beam of any one of examples 26 to 40, wherein the plurality of second sections includes at least four sections that each: 1) are spaced from one another along the second direction, and 2) are parallel to each other.

Example 41

A cross-car beam comprising: a plastic beam body defining a first end and a second end spaced from the first end along a first direction, such that the plastic beam body is elongate along the first direction, the plastic beam body further defining a cross-sectional shape along a plane normal to the first direction, the cross-sectional shape defining: 1) a first section elongate in a second direction that is perpendicular to the first direction, and 2) a plurality of second sections that extend from the first section along a respective direction that is perpendicular with respect to the first direction and angularly offset with respect to the second direction; and a metallic beam body coupled to the plastic beam body, the metallic beam body defining a first end and a second end spaced from the first end of the metallic beam body along the first direction, such that the metallic beam body is elongate along the first direction.

Example 42

The cross-car beam of example 41, wherein adjacent ones of the plurality of second sections each extend from the first section along a third direction that is perpendicular to both the first direction and the second direction.

Example 43

The cross-car beam of example 42, wherein the adjacent ones of the plurality of second sections each extend from one of a pair of opposed ends of the first section along the third direction.

Example 44

The cross-car beam of example 43, wherein the first section is straight between the pair of opposed ends along the second direction.

Example 45

The cross-car beam of any one of examples 43 and 44, wherein the adjacent ones of the plurality of second sections each extend from one of the pair of opposed ends of the first section in the same direction.

Example 46

The cross-car beam of any one of examples 41 to 45, wherein the first section is a first of a plurality of first sections, the cross-sectional shape defines a second of the plurality of first sections, and the cross-sectional shape further defines a third of the plurality of first sections that: 1) is spaced from the second of the plurality of first sections along the second direction, and 2) is coplanar with the second of the plurality of first sections.

Example 47

The cross-car beam of any one of examples 41 to 46, wherein a first of the plurality of second sections and a second of the plurality of second sections: 1) are spaced from each another along the second direction, and 2) are parallel to each other.

Example 48

The cross-car beam of any one of examples 41 to 47 wherein the plastic beam body includes a reinforced plastic material.

Example 49

The cross-car beam of example 48 wherein the reinforced plastic material includes a carbon fiber composite.

Example 50

The cross-car beam of example 49, wherein the carbon fiber composite includes at least one of chopped carbon fiber and continuous carbon fiber.

Example 51

The cross-car beam of example 49, wherein the carbon fiber composite includes 40 percent short carbon fiber reinforced polyamide 66.

Example 52

The cross-car beam of any one of examples 41 to 51, wherein the plastic beam body is monolithic.

Example 53

The cross-car beam of any one of examples 41 to 52, further comprising an opening that extends from the first end to the second end along the first direction, the opening partially defined by the plastic beam body, and partially defined by the metallic beam body, such that the opening is entirely enclosed with respect to all directions perpendicular to the first direction at a location along the first direction.

Example 54

The cross-car beam of any one of examples 41 to 53, wherein the metallic beam body includes steel.

Example 55

The cross-car beam of any one of examples 41 to 54, further comprising an adhesive coupling the metallic beam body to the plastic beam body.

Example 56

The cross-car beam of any one of examples 41 to 55, further comprising a plurality of fasteners, wherein the plastic beam body defines a first plurality of apertures, the metallic beam body defines a second plurality of apertures, and each of the plurality of fasteners is inserted through one of the first plurality of apertures and one of the second plurality of apertures to couple the metallic beam body to the plastic beam body.

Example 57

The cross-car beam of any one of examples 41 to 56, further comprising a plurality of inserts coupled to one of the plastic beam body and the metallic beam body, the plurality of inserts partially defining a first plurality of apertures, and the one of the plastic beam body and the metallic beam body partially defining the first plurality of apertures, wherein each of the first plurality of apertures is configured to receive one of a plurality of fasteners to couple a component to the cross-car beam.

Example 58

The cross-car beam of any one of examples 41 to 57, wherein the metallic beam body is monolithic.

Example 59

The cross-car beam of any one of examples 1 to 58, wherein the cross-sectional shape is constant from the first end of the plastic beam body to the second end of the plastic beam body.

Example 60

The cross-car beam of any one of examples 41 to 59, wherein the metallic beam body includes an inner surface that faces the plastic beam body, and an outer surface that is opposite the inner surface.

Example 61

A cross-car beam comprising: a first beam body defining a first end, a second end spaced from the first end in a first direction such that the first beam body is elongate along the first direction, the first beam body defining a first cross-sectional shape that lies along a plane normal to the first direction, wherein the first cross-sectional shape is substantially circular; and a second beam body defining a first end, a second end spaced from the first end of the second beam body in the first direction such that the second beam body is elongate along the first direction, the second beam body defining a second cross-sectional shape that lies along the plane, wherein the second cross-sectional shape is substantially circular.

Example 62

The cross-car beam of example 61, wherein the first beam body includes a first material, the second beam body includes a second material, and the first material and the second material are identical.

Example 63

The cross-car beam of example 61, wherein the first beam body includes a first material, the second beam body includes a second material, and the first material is different than the second material.

Example 64

The cross-car beam of any one of examples 62 to 63, wherein the first material includes plastic.

Example 65

The cross-car beam of any one of examples 62 to 63, wherein the first material includes a reinforced plastic material.

Example 66

The cross-car beam of example 65, wherein the reinforced plastic material includes a carbon fiber composite.

Example 67

The cross-car beam of example 66, wherein the carbon fiber composite includes at least one of chopped carbon fiber and continuous carbon fiber.

Example 68

The cross-car beam of example 66, wherein the carbon fiber composite includes 40 percent short carbon fiber reinforced polyamide 66.

Example 69

The cross-car beam of any one of examples 61 to 68, wherein the plastic beam body is monolithic.

Example 70

The cross-car beam of any one of examples 61 to 69, wherein the first cross-sectional shape is circular, and the second cross-sectional shape is circular.

Example 71

The cross-car beam of example 70, wherein the first cross-sectional shape and the second cross-sectional shape are concentric.

Example 72

The cross-car beam of any one of examples 61 to 71, further comprising a third beam body defining a first end, a second end spaced from the first end of the third beam body in the first direction such that the third beam body is elongate along the first direction, the third beam body defining a third cross-sectional shape along the plane, wherein the third cross-sectional shape is substantially circular.

Example 73

The cross-car beam of example 72, wherein the third beam body includes a third material, and the third material is different than at least one of the first material and the second material.

Example 74

The cross-car beam of any one of examples 72 to 73, wherein the first cross-sectional shape is circular and the third cross-sectional shape is circular.

Example 75

The cross-car beam of example 74, wherein the first cross-sectional shape and the third cross-sectional shape are concentric.

Example 76

The cross-car beam of any one of examples 61 to 75, wherein the first cross-sectional shape is constant from the first end to the second end.

Example 77

A dashboard assembly configured to be inserted between a first A-pillar and a second A-pillar of a vehicle, the dashboard assembly comprising: the cross-car beam of any one of examples 1 to 76; a first coupling mechanism configured to couple the cross-car beam to the first A-pillar; and a second coupling mechanism configured to couple the cross-car beam to the second A-pillar.

Example 78

The dashboard assembly of example 77, wherein the first coupling mechanism is a first bracket coupled to both the cross-car beam and the first A-pillar, and the second coupling mechanism is a second bracket coupled to both the cross-car beam and the second A-pillar.

Example 79

The dashboard assembly of example 78, further comprising a steering column, an airbag deployment assembly, an HVAC assembly, an instrument panel, a glove box, or any combination thereof, coupled to the cross-car beam.

Example 80

The dashboard assembly of example 79, further comprising a plurality of brackets, each of the plurality of brackets coupled to both the cross-car beam and at least one of the steering column, the airbag deployment assembly, the HVAC assembly, the instrument panel, and the glove box.

Example 81

The dashboard assembly of example 80, wherein the cross-car beam is a first cross-car beam, and the dashboard assembly includes a second cross-car beam that is identical to the first cross-car beam.

Example 82

A vehicle including an engine housed in an engine compartment and a passenger compartment configured to at least partially enclose a passenger of the vehicle, the vehicle comprising: the cross-car beam of any of examples 1 to 76, the cross-car beam positioned between the engine compartment and the operator compartment.

Example 83

A vehicle including an engine compartment and a passenger compartment configured to at least partially enclose a passenger of the vehicle, the vehicle comprising: the cross-car beam of any of examples 17 to 24 and 60, the cross-car beam positioned between the engine compartment and the passenger compartment, wherein the outer surface of the metallic beam body faces the engine compartment.

What is claimed:

1. A cross-car beam comprising:
    a plastic beam body that defines a first end, a second end spaced from the first end in a first direction, such that the plastic beam body is elongate along the first direction, wherein the plastic beam body defines a cross-sectional shape along a plane normal to the first direction, wherein the cross-sectional shape defines: 1) a first section that is elongate in a second direction that is perpendicular to the first direction, and 2) a plurality of second sections that are each elongate along a third direction that is perpendicular to both the first direction and the second direction, and
    wherein the plastic beam body includes a reinforced plastic material, and wherein the first section is a first of a plurality of first sections, the cross-sectional shape comprising a second of the plurality of first sections, and a third of the plurality of first sections that is spaced from the second of the plurality of first sections along the second direction, or is coplanar with the second of the plurality of first sections, and
    wherein the plastic beam body includes a carbon fiber or a glass fiber composite, having a polymer matrix.

2. The cross-car beam of claim 1, further comprising: a metallic beam body coupled to the plastic beam body, such that an inner surface of the metallic beam body faces the plastic beam body, and an outer surface of the metallic beam body that is opposite the inner surface faces away from the plastic beam body.

3. The cross-car beam of claim 2, wherein the plastic beam body is overmolded onto the metallic beam body.

4. The cross-car beam of claim 2, wherein the metallic beam body includes steel.

5. The cross-car beam of claim 1, wherein a first of the plurality of second sections and a second of the plurality of second sections are: spaced from each another along the second direction; or are parallel to each other.

6. The cross-car beam of claim 1, wherein the reinforced plastic material is either of: a polypropylene reinforced with 40 wt % to 60 wt % of long glass fiber; or a polyamide 66 reinforced with 20 wt % to 40 wt % of short carbon fiber.

7. The cross-car beam of claim 1, wherein the plastic beam body is monolithic.

8. The cross-car beam of claim 1, wherein adjacent ones of the plurality of second sections each extend from the first section in the third direction.

9. The cross-car beam of claim 8, wherein the adjacent ones of the plurality of second sections each extend from one of a pair of opposed ends of the first section along the third direction.

10. The cross-car beam of claim 1, further comprising an opening that extends from the first end to the second end along the first direction, the opening at least partially defined by the plastic beam body.

11. The cross-car beam of claim 1, wherein the plurality of first sections includes at least three sections that each: are spaced from one another along the second direction; and are coplanar with each other.

12. A dashboard assembly configured to be inserted between a first A-pillar and a second A-pillar of a vehicle, the dashboard assembly comprising:
    the cross-car beam of claim 1;
    a first coupling mechanism configured to couple the cross-car beam to the first A-pillar; and
    a second coupling mechanism configured to couple the cross-car beam to the second A-pillar.

13. A vehicle including an engine compartment and a passenger compartment configured to at least partially enclose a passenger of the vehicle, the vehicle comprising:
    the cross-car beam of claim 1, the cross-car beam positioned between the engine compartment and the passenger compartment.

14. The vehicle of claim 13, wherein the cross-car beam is positioned between the engine compartment and the passenger compartment, and wherein the metallic beam body faces the engine compartment, or wherein the plastic beam body faces the engine compartment.

\* \* \* \* \*